E. L. GALE, Sr.
BRAKE MAGNET PROTECTIVE DEVICE.
APPLICATION FILED APR. 20, 1909.
1,014,216.
Patented Jan. 9, 1912.
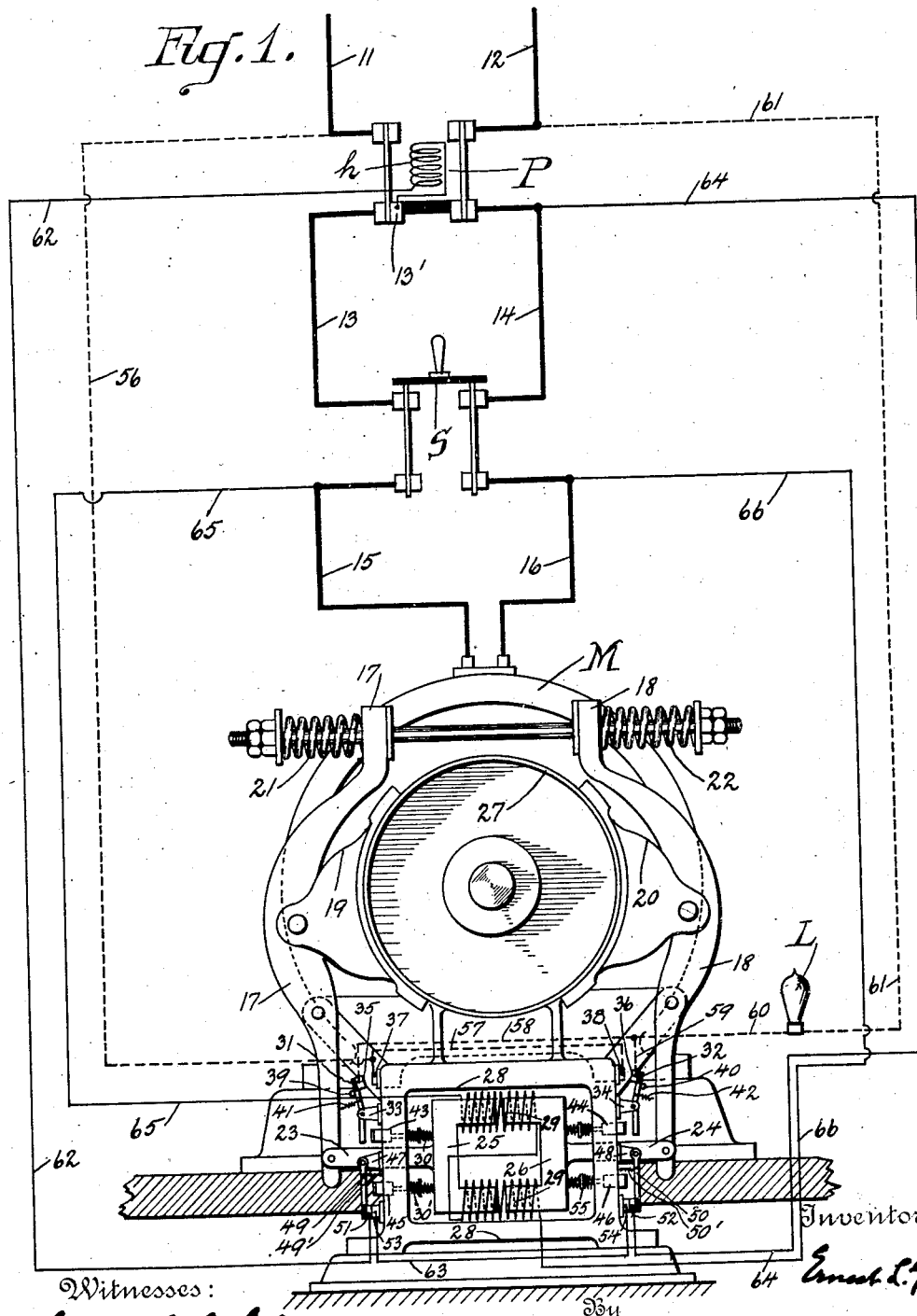

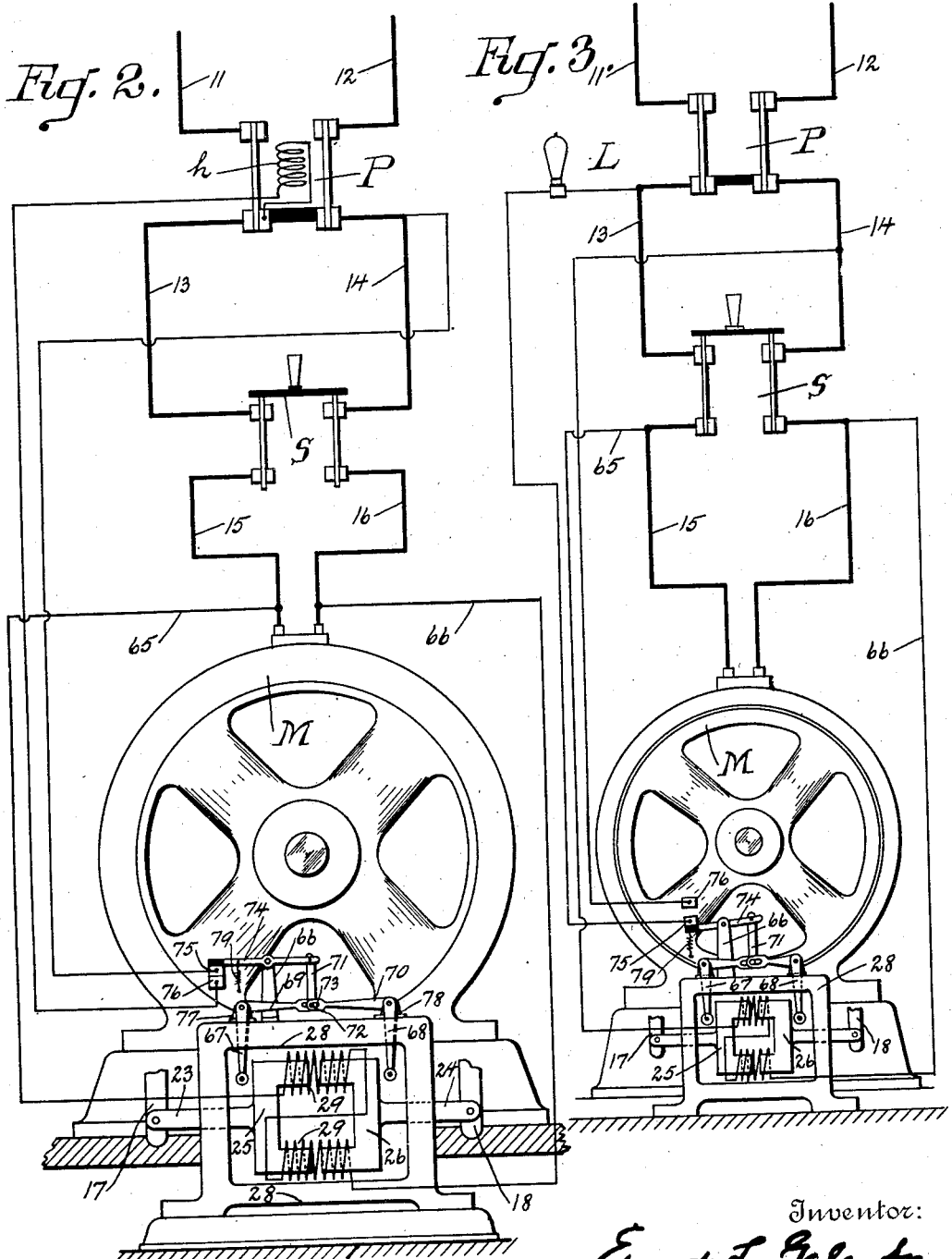

UNITED STATES PATENT OFFICE.

ERNEST L. GALE, SR., OF YONKERS, NEW YORK, ASSIGNOR TO OTIS ELEVATOR COMPANY, OF JERSEY CITY, NEW JERSEY, A CORPORATION OF NEW JERSEY.

BRAKE-MAGNET PROTECTIVE DEVICE.

1,014,216.   Specification of Letters Patent.   Patented Jan. 9, 1912.

Application filed April 20, 1909. Serial No. 491,165.

*To all whom it may concern:*

Be it known that I, ERNEST L. GALE, Sr., a citizen of the United States, residing at Yonkers, in the county of Westchester and State of New York, have invented a new and useful Improvement in Brake-Magnet Protective Devices, of which the following is a specification.

My invention relates to a protective device, more particularly designated as a brake magnet protective device for electro-magnets, and especially adapted for use with alternating current brakes.

One of the objects of my invention is to prevent the flow of excessive current in the brake magnet winding.

A further object is to provide a fuseless device of this character which shall be positive in action, and effective and efficient in operation.

A still further object is to provide means for attracting the attention of an attendant to the inoperative condition of the brake.

Other novel features will be subsequently set forth and claimed in the appended claims.

In the accompanying drawings, Figure 1 is a view of my invention as applied to an alternating current brake, and in conjunction with a motor; Figs. 2 and 3 show modifications of the same, with the brake pulley and part of the brake mechanism omitted.

Referring to Fig. 1, the single-phase motor M is connected to the supply mains 11, 12, through the automatic switch P, wires 13, 14, manual switch S, and wires 15, 16, in the ordinary well known way.

The brake comprises a pair of brake shoes 19, 20, which are pressed against the brake pulley 27 by the action of the brake levers 17, 18, and the brake springs 21, 22, in a well known manner. A pair of magnet cores 25, 26 are movably mounted in the supporting frame 28, and the arms 23, 24, connect the cores with the brake levers 17, 18, respectively, so that the inward movement of the magnet cores 25, 26, effects the moving of the said levers, and the consequent lifting of the brake shoes 19, 20. The brake springs 21, 22 are operative to apply the brake shoes 19, 20 to the brake pulley 27, and to return the cores 25, 26 to their unoperated position when the brake magnet is deënergized.

The brake magnet winding 29 is preferably of such a shape and in such a position that the movable cores 25, 26 are free to move toward each other therein, when the magnetizing current flows in the winding 29. The circuit through the magnet winding is closed when both the automatic switch P and the switch S are closed. This circuit is traced from the motor lead wire 15, through wire 65, brake winding 29, and wire 66 to the other motor lead wire 16. It is well known that the current taken by an alternating current magnet of this type, when the magnet cores are far apart, is greatly in excess of that required when the cores are near together, and the holding current in the energized position is much less than that required to actuate the cores from their released position. In a brake of this type the cores may be so widely separated, when released, that the current required to pull the cores together will be excessive, and may even cause the burning out of the brake winding. For instance, if one of the brake shoes 19, 20, becomes worn, the spring 21 or 22 will force the corresponding brake lever 17 or 18 inwardly to press the brake shoe against the brake pulley 27. Since the brake lever is pivoted near its middle portion, the inward motion of the spring end of the lever, carries the core end outward, and the magnet cores are thereby separated. The wearing of the brake shoes may be so great that the cores are widely separated when the magnets are deënergized, and the air gap becomes so long that an excessive current is required to close the air gap by attracting the cores.

If the application of the brake shoes 19, 20 moves the cores 25, 26 too far apart, it is obviously necessary that some attention be given to the brake to prevent an excessive current from burning out the brake windings. My invention automatically protects the brake winding when one or both cores are released too far, or a signal device is automatically operated to call the attention of an attendant to the condition of the brake.

Again referring to Fig. 1, two pairs of contact levers 31, 32 and 49, 50 are pivoted in the holders 33, 34, and 47, 48, which are suitably secured to the frame 28 and carry the contacts 35, 36 and 51, 52 which are adapted to make connections with the fixed contacts 37, 38 and 53, 54 respectively. Projecting through the supporting frame 28 on either side, are the buffer bars 43, 44, 45, 46, which are adapted to be engaged by the cores 25, 26 when the latter are separated. Each of the said buffer bars is provided with an adjustable nut 55 to which is attached a buffer spring 30, and a coil spring 30′ is placed about the buffer bar between the nut 55 and the frame 28 to return the said bar to its normal position. The buffer bars and the springs 30 are so located that when the cores 25, 26 are separated too far the springs are compressed and the buffer bars are caused to engage their respective levers 31, 32, 49, 50.

The first pair of levers 31, 32 are held against the stops 39, 40 by the springs 41, 42 respectively, so that the contacts 35, 36 are separated from the corresponding fixed contacts 37, 38; the action of the buffer bars 43, 44, when operated is to connect the separated contacts. This contact connecting feature may be utilized to close a circuit through a lamp L, or other suitable signal device. The circuit may be traced from main wire 11, through wires 56, 57 to the fixed contacts 37, 38; thence through either contact 35 and wire 58, or contact 36 and wire 59, or through both contacts and wires 58, 59 to the wire 60, through the lamp L, or other signal device, and through the wire 61 to the other main wire 12. A switch lever is placed on both ends of the support 28 for the reason that one of the magnet cores 25 or 26 might be released too far and not the other, either of which would be equally dangerous.

The lower pair of levers 49, 50 are held normally in a closed position by the springs 49′, 50′, so that the contacts 51, 52, carried by the levers are in connection with the corresponding fixed contacts 53, 54. The action of the buffer bars 45, 46 is to separate the said connections, and if the holding coil h of the automatic switch P is connected through these contacts, the separation thereof will deënergize the holding coil h and cause the switch P to be opened automatically. This holding coil circuit is closed only when the automatic switch is closed, and the circuit therefor may be traced from the contact 13′ through the holding coil h, wire 62, contacts 51, 53, wire 63, contacts 54, 52, wires 64, 14, through the automatic switch P to the lead wire 12. It is evident that when either lever 49, or 50 is operated, the circuit will be broken and the operating switch P automatically opened. Where, therefore, either core 25, 26, has been released too far, the operating switch will be automatically opened, and at the same time, the signal device L will be energized. Both of these features are not absolutely necessary at the same time, and either one may be separately used, or both may be used together. Each operation is separately distinct, and additional security is obtained by the use of the two in the same installation.

If, in my invention, the cores have been released too far, it would be impossible to energize the brake without operative attention thereto, and the signal device would disclose the fact that the cores had been released too far. It is also evident that it would be impossible to start the motor under these circumstances, for if the automatic switch P were closed by manual means, the holding coil h could not receive current because its circuit is broken, and the automatic switch would not remain permanently closed.

Modifications of my invention embodying the same principles are obvious in Figs. 2 and 3, in which the buffer bars are replaced by lever arms which are mechanically joined; either one or both together being operable to open or close an electrical switch.

Referring now to Fig. 2, the same general arrangement of the motor and brake is shown as in Fig. 1; the brake pulley and part of the brake mechanism being omitted for showing the new features more clearly. The holders 77, 78 are secured to the frame 28 and the lever arms 67, 69 and 68, 70 are rotatably mounted in the respective holders. Each pair of lever arms is integrally formed or secured to the same rotatable member so that the movement of one of the arms causes the corresponding movement of the other arm. Both of the arms 69, 70 are provided with a slot 73, and the link 71 is provided with a pin 72 which passes through the said slot 73 in each of the two lever arms 69, 70; when either one of the arms 67 or 68 is engaged by the release of core 26 or 27, the arms 69, 70 and the link 71 are moved downwardly. The lever 74 is pivotally mounted in the holder 66, and carries an electrical contact 75 on one end, and the link 71 is attached to the other end, so that the movement of the link effects a corresponding movement of the contact lever 74. A fixed contact 76 is placed to make connection with the contact 75, and the spring 79 is suitably attached to the lever 74 to hold the contacts normally together. The downward movement of the link 71 separates the contacts 75, 76, thereby breaking the circuit through the automatic switch holding coil h in a well known manner, to open the automatic switch P.

Fig. 3 shows an arrangement similar in action to that of Fig. 2, the essential difference being that the contacts 75, 76 are so placed that they are normally separated, and when the release of the cores 25, 26 operates the levers 67, 68, the link 71 moves the lever 74 to connect the contacts 75, 76, the function of the spring 79 in this case being to hold the lever 74 in such a position that the contacts 75, 76 will be normally separated. When the said contacts are electrically connected, a circuit is closed through the lamp L or some other signal device.

I desire not to be limited to the exact construction and arrangement of my invention, as it is evident that various changes may be made by those familiar with the art, to conform to the varied demands for protective service, without departing from the spirit and scope of my invention.

What I claim and desire to secure by Letters Patent of the United States is:—

1. The combination of an alternating current brake comprising movable magnet cores, and electro-responsive means for indicating when the cores are too far released.

2. The combination of an alternating current brake comprising a movable magnet core or cores, and means operated by the cores to signal when the core or cores are too far released.

3. The combination of an alternating current brake comprising cores which are operatively attracted when the brake is energized and released when the brake is deenergized, and means operated by the cores to signal when the cores are too far released.

4. The combination of an electro-magnet having movable cores which are adapted to reduce an air gap when the electro-magnet is energized and which are separated to lengthen the air gap when the electro-magnet is deënergized, and means for automatically operating a signal when the air gap is increased beyond a certain definite limit.

5. The combination of an electro-magnet having a variable air gap, circuit connections for supplying energizing current to the electro-magnet, and means for automatically opening the circuit to the electro-magnet when the air gap of the electro-magnet is increased beyond a definite amount.

6. The combination of an electro-magnet having movable cores which are adapted to be attracted to close the air gap when the electro-magnet is energized and separated to widen the air gap when the electro-magnet is deënergized, and a switch connected to the magnet to be operatively engaged when the core or cores are moved apart a predetermined excess amount.

7. The combination of an electro-magnet having movable cores which are adapted to be attracted to close an air gap when the electro-magnet is energized and separated to form an air gap when the electro-magnet is deënergized, and a plurality of switches operatively engaged when the core or cores are separated a predetermined excess amount, separate signal and protective devices energized when the said switches are operatively engaged, and means for automatically returning the switches to their normal positions when said core or cores are returned.

8. The combination of an alternating current brake, comprising a frame, magnet cores movable therein, signal devices, and means for operating the signal devices by the movement of the said cores.

9. The combination of an alternating current brake comprising a frame, magnet cores movably mounted therein attracted when the brake is energized, means for returning the cores to their unattracted position, and a protective device operated by the cores when they are returned beyond the said position.

10. The combination of an alternating current brake comprising a frame, magnet cores movably mounted therein attracted when the brake is energized, means for releasing the cores to their unattracted position, and a protective device operated when the cores are too far released.

11. The combination of an alternating current brake comprising a frame, magnet cores movably mounted therein and attracted when the brake is energized, brake levers attached to the magnet cores and movable therewith, means for returning the levers and the cores to a released position, and means associated with the levers and cores operative to prevent the attraction of the cores when they are too far released.

12. The combination of an alternating current brake comprising a frame, magnet cores movable therein attracted when the brake is energized, brake levers attached to the magnet cores, brake shoes secured to the levers, a brake pulley, means for applying the brake shoes to the brake pulley when the brake is deënergized, and means for preventing the reënergizing of the brake when the brake shoes are worn to a predetermined extent.

13. The combination of an alternating current brake comprising a frame, magnet cores movable therein attracted when the brake is energized, brake levers attached to the magnet cores, brake shoes secured to the levers, a brake pulley, means for applying the brake shoes to the brake pulley when the brake is deënergized, and means for preventing the reënergizing of the brake when the brake shoes are worn down a predetermined amount.

14. The combination with an alternating current motor, of an alternating current brake, levers operated when the brake magnet cores are released too far, means associated with the levers for signaling whenever the cores are released too far, and means for preventing the starting of the motor when the levers are operated.

15. The combination with an alternating current motor, of an alternating current brake, levers operated when the brake magnet cores are released too far, a signal device operated by the levers when the cores are released too far, and means for preventing the reënergizing of the brake and the starting of the motor when the levers are operated.

16. The combination with an alternating current motor, of an alternating current brake, levers automatically operated when the brake magnet cores are released too far, a signal device energized when the levers are automatically operated, and an electromagnetic circuit breaker opened when the magnet cores are released too far to prevent current being supplied to the motor and the brake.

17. The combination with an alternating current motor, of an alternating current brake, levers operated when the brake magnet cores are released too far, a signal lamp lighted when the magnet cores are released too far, and a circuit breaker operative to prevent the energization of the brake and the starting of the motor when the levers are engaged.

18. The combination of an alternating current brake comprising a frame, magnet cores movable therein attracted when the brake is energized, brake levers attached to the magnet cores, brake shoes secured to the levers, a brake pulley, coil springs for applying the brake shoes to the brake pulley and for returning the cores to their released position when the brake is energized, a signal device, and means associated with the cores for automatically operating the signal device upon the return of the cores when the brake shoes are worn down a predetermined amount.

19. The combination of an alternating current brake comprising a frame, magnet cores movable therein attracted when the brake is energized, brake levers attached to the magnet cores, brake shoes secured to the levers, a brake pulley, coil springs for applying the brake shoes to the brake pulley and for returning the cores to their released position when the brake is deënergized, a signal device, and means for automatically operating the signal device when the cores are returned, and for preventing the reënergizing of the brake when the cores are too far released.

20. The combination of an alternating current brake comprising a frame, magnet cores movable therein attracted when the brake is energized and released when it is deënergized, devices fixed to the frame which are mechanically operated by the magnet cores, and means associated with the devices to protect the brake winding and to signal that the magnet cores have been too far released.

21. The combination of an alternating current brake comprising a frame, magnet cores movable therein attracted when the brake is energized and released when it is deënergized, levers operated by the magnet cores, and means associated with the levers to signal upon operating of the levers that the magnet cores have been too far released, and to prevent subsequent attraction of the cores.

22. The combination of an alternating current brake comprising a frame, magnet cores movable therein attracted when the brake is energized and released when it is deënergized, a lever, a device operative to turn the lever when the cores are too far released, and means associated with said lever for signaling that the lever has been operated, and to prevent the reënergization of the brake.

23. The combination of an alternating current brake comprising a frame, magnet cores movable therein attracted when the brake is energized and released when it is deënergized, a plurality of levers, buffer bars which operate the levers when the cores are too far released, and means associated with the levers to signal that the cores are too far released, and to prevent the reënergization of the brake.

24. The combination of an alternating current brake, comprising a frame, magnet cores movable therein attracted when the brake is energized and released when it is deënergized, levers, bars for automatically operating the levers when the cores are released too far, and springs for automatically returning the bars to their normal unoperated position.

25. The combination of an alternating current brake, comprising a frame, magnet cores movable therein attracted when the brake is energized and released when it is deënergized, levers, buffer bars for automatically operating the levers when the cores are released too far, and means for adjusting the length of the bars thereby varying the point where the levers will be automatically operated by the said buffer bars.

26. The combination of an alternating current brake comprising a frame, magnet cores movable therein attracted when the brake is energized and released when it is deënergized, a plurality of levers, buffer bars to operate the levers when one or both of the cores are too far released, and means associated with the levers for signaling that the cores are too far released, and to prevent the reënergization of the brake.

27. The combination of an alternating current brake comprising a frame, magnet cores movable therein attracted when the brake is energized and released when it is deënergized, a plurality of levers, buffer bars which operate the levers when one or both of the cores are too far released, electrical connections adapted to be closed and opened by the movements of the levers, means associated with the electrical connections for signaling that the cores are too far released, and to prevent the reënergization of the brake.

28. The combination of an alternating current brake comprising a frame, magnet cores movable therein attracted when the brake is energized and released when it is deënergized, levers, bars for automatically operating the levers when the cores are released, means for varying the point at which the levers are automatically operated, and means associated with the levers to give notice that the levers have been operated and to protect the brake from further energization.

29. The combination of an alternating current brake comprising a frame, magnet cores movable therein attracted when the brake is energized and released when it is deënergized, levers, buffer bars for automatically operating the levers when the cores are too far released, electrical connections adapted to be closed and opened by the movement of each lever, and means associated with the buffer bars and the electrical connections for signaling that the cores have been too far released, and for preventing the reënergization of the brake.

30. The combination of an alternating current brake comprising a frame, magnet cores movable therein attracted when the brake is energized and released when it is deënergized, levers mechanically operable at the same time, buffer bars for automatically operating the levers when the cores are too far released, an electrical connection adapted to be opened or closed when one or both buffer bars engage the corresponding lever, and means for preventing the reënergization of the brake, and for signaling that the cores are too far released when the said electrical connection is opened or closed.

31. The combination of an alternating current brake comprising a frame, magnet cores movable therein attracted when the brake is energized and released when it is deënergized, levers at opposite ends of the frame and mechanically operable at the same time, buffer bars for automatically engaging the levers when the cores are too far released, and means associated with the levers for protecting the brake winding and for signaling that the cores have been released too far when the levers are operated.

32. The combination of an alternating current brake comprising a frame, magnet cores movable therein attracted when the brake is energized and released when it is deënergized, levers pivoted at opposite ends of the frame, buffer bars extending through the frame operative to engage the levers when the magnet cores are released too far, and devices operated by the levers to protect the brake magnet winding and to signal that the cores have been released too far.

33. The combination of an alternating current brake comprising a frame, magnet cores movable therein attracted when the brake is energized and released when it is deënergized, levers in pairs one of each pair suitably pivoted at each end of the fixed frame, buffer bars for automatically operating the levers when the cores are released too far, electrical connections opened or closed when the levers are operated, a signal device in connection with the levers which closes the electrical connections for signaling that the cores are released, and a switch device in connection with the levers which open electrical connections for preventing the reënergizing of the brake.

34. The combination with an alternating current brake, of a frame, a magnet winding, magnet cores movable in the frame and in the winding operated to close an air gap between the cores when current flows in the magnet winding, means for mechanically separating the cores when current ceases to flow in the magnet winding, levers, means for automatically operating the levers when the cores are too far separated, and means associated with the levers for signaling that the levers have been operated, and for preventing a circuit to be closed through the magnet winding.

35. The combination of an alternating current brake comprising a frame, a magnet winding, magnet cores movable in the frame and into the winding operative to close an air gap between the cores when current flows in the magnet winding, means for mechanically separating the cores when current ceases to flow in the magnet winding, levers, means for automatically operating the levers when the cores are too widely separated, a circuit opening device in the magnet winding circuit, and means for automatically operating the circuit opening device when the cores are too widely separated.

In testimony whereof, I have signed my name to this specification in the presence of two subscribing witnesses.

ERNEST L. GALE, Sr.

Witnesses:
  ROGER W. FLAGG,
  EDWARD H. STEELE.